US006952731B2

(12) United States Patent
Picca et al.

(10) Patent No.: US 6,952,731 B2
(45) Date of Patent: Oct. 4, 2005

(54) REMOTE CONTROL OF A DEVICE OVER THE INTERNET

(75) Inventors: Andre Picca, Gières (FR); Stephane Lechner, Chenf/Leman (FR); James E. Obert, Boise, ID (US); Philippe Eckert, Lausanne (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 642 days.

(21) Appl. No.: 09/929,839

(22) Filed: Aug. 14, 2001

(65) Prior Publication Data

US 2003/0037122 A1 Feb. 20, 2003

(51) Int. Cl.[7] .............................................. H04L 29/06
(52) U.S. Cl. ...................... 709/225; 709/219; 709/235
(58) Field of Search ................................ 709/225, 219, 709/201, 203, 235

(56) References Cited

U.S. PATENT DOCUMENTS

| 6,023,722 A | 2/2000 | Colyer .................... 709/201 |
| 6,088,796 A | 7/2000 | Cianfrocca et al. .......... 713/152 |
| 6,671,728 B1 * | 12/2003 | Mayberry .................. 709/227 |

FOREIGN PATENT DOCUMENTS

| EP | 0 959 586 A2 | 11/1999 |
| EP | 1 104 964 A1 | 6/2001 |
| GB | 2 336 920 A | 11/1999 |
| WO | 00/78005 A2 | 12/2000 |
| WO | 02/052413 A2 | 7/2002 |

OTHER PUBLICATIONS

U.S. Appl. No. 10/036,849, filed Nov. 8, 2001, Picca et al.
U.S. Appl. No. 10/218,201, filed Aug. 12, 2002, Picca et al.
Wise, M.J., et al., "Message–Brokers: A Novel Interprocess Communications Primitive," *System Sciences, IEEE, Proceedings of the 26th Hawaii International Conference on Wailea, HI*, pp. 184–193 (Jan. 5, 1993).

* cited by examiner

Primary Examiner—Kamini Shah

(57) ABSTRACT

A method of controlling a device via the Internet comprising the steps of;
  generating a device instruction,
  encoding the device instruction using an Internet protocol,
  transmitting the encoded device instruction to a message broker, and
  transmitting a message request to the message broker encoded using an Internet protocol to receive device information received by the message broker.

13 Claims, 4 Drawing Sheets

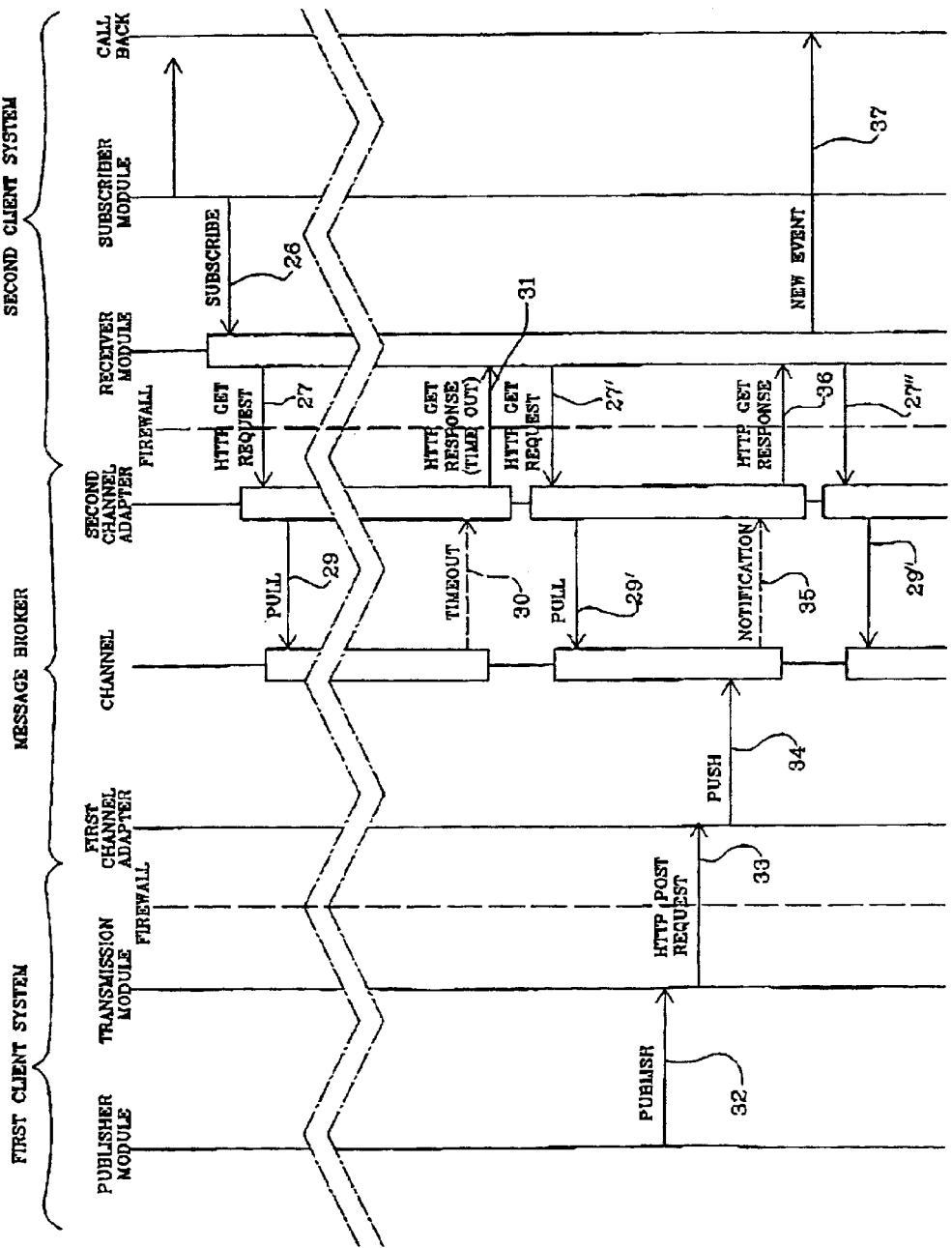

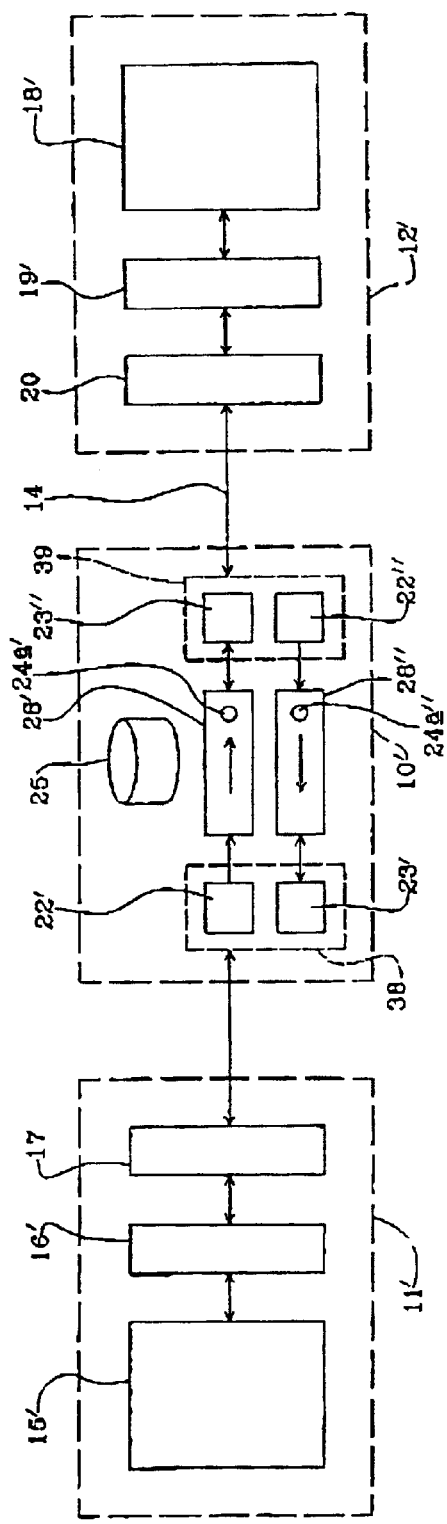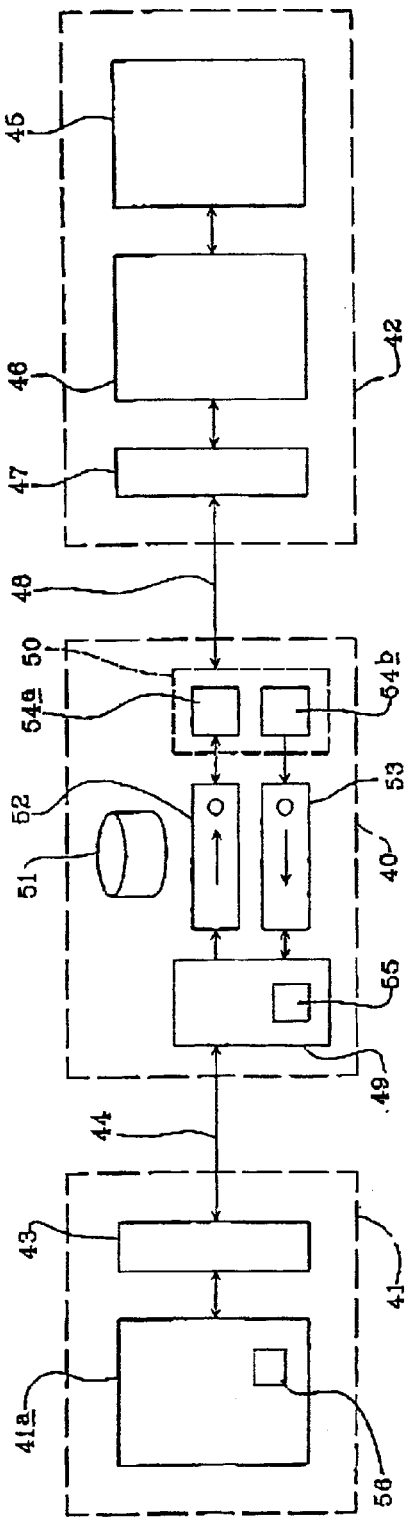

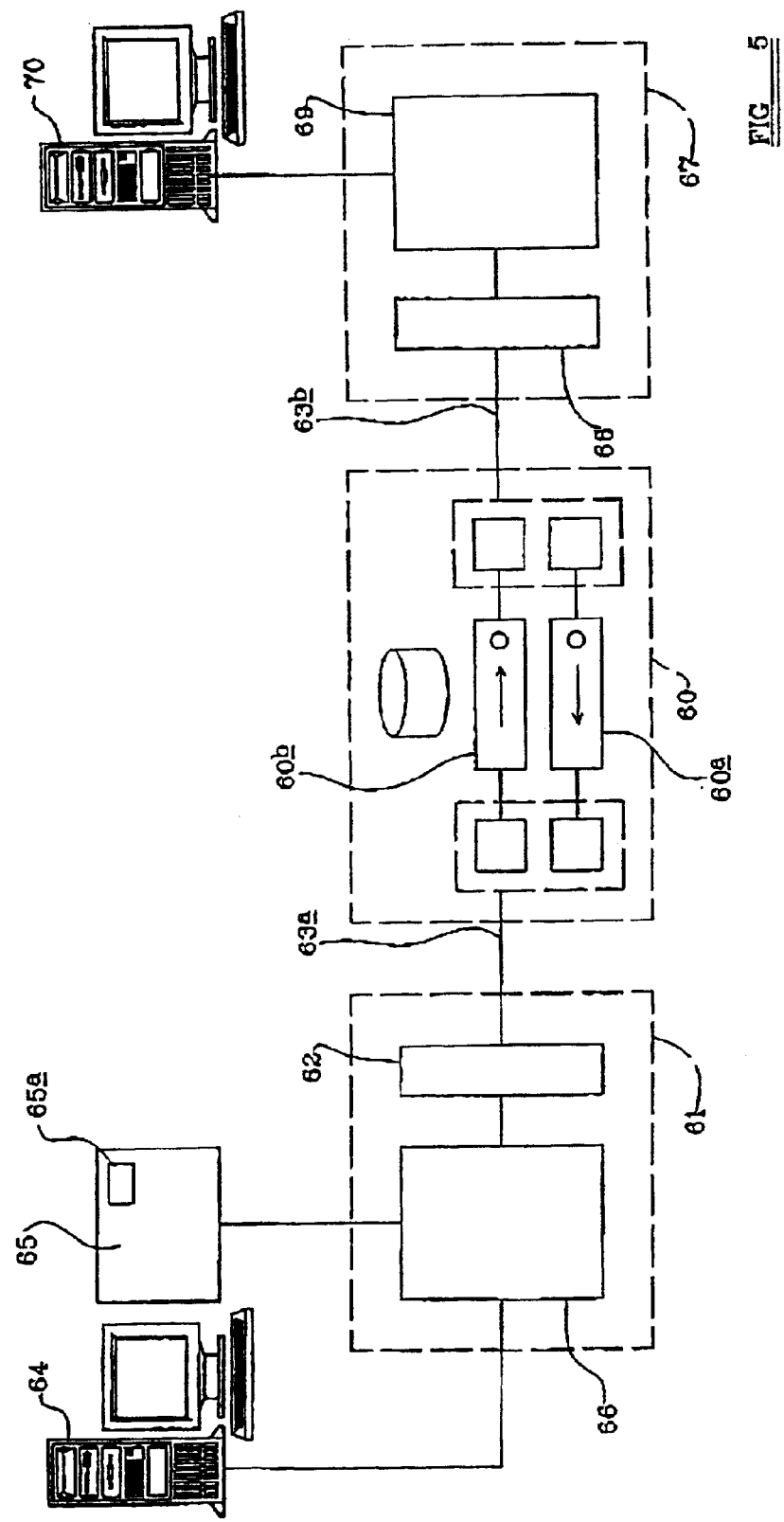

REMOTE CONTROL OF A DEVICE OVER THE INTERNET

CROSS REFERENCE TO RELATED APPLICATIONS

The subject matter of the present application may also be related to the following U.S. Patent Applications: "Message Broker," Ser. No. 10/036,849, filed Nov. 8, 2001; and "Message Broker," Ser. No. 10/218,201, filed Aug. 12, 2002.

DESCRIPTION OF THE INVENTION

This invention relates to a method of controlling a device via the Internet, a remote control module operable to perform the method, a method of communicating instructions received by the internet to a device, a device control module and a system for remote controlling a device over the Internet.

BACKGROUND OF THE INVENTION

It is known and desirable to be able to take remote control of a device using a computer, for example, for the purposes of trouble shooting or maintenance of the device. In general, this requires the controlling PC and remote control device to be provided with appropriate software to enable the remote control. However, where the connection between the controlling computer and the remote control device is to be provided via the Internet, is often the case that the commands must pass trough a firewall. Conventionally, firewalls are operable to prevent the passage of any messages other than those encoded in a suitable protocol.

An aim of the invention is to provide a new or improved method of controlling a device by the Internet.

SUMMARY OF THE INVENTION

According to a first aspect of the invention we provide a method of controlling a device via the Internet comprising the steps of generating a device instruction, encoding the device instruction using an Internet protocol, transmitting the encoded device instruction to a message broker, and transmitting a message request to the message broker encoded using an Internet protocol to receive device information received by the message broker.

The method device instruction, message request and device information may be encoded in an Internet protocol comprising HTTP.

The method device instruction may be generated in a Peripheral Meta Language (PML).

The method may comprise the further step of generating an output in response to the device information.

The method encoded device instruction may comprise destination information readable by the message broker.

The method device instruction may comprise device identification information.

According to a second aspect of the invention, we provide a remote control module which is operable to perform a method according to the first aspect of the invention.

According to a third aspect of the invention, we provide a method of communicating instructions received via the Internet to a device which comprises the steps of transmitting a message request to a message broker encoded using an Internet protocol to receive a device instruction received by the message broker, receiving a device instruction encoded using an Internet protocol in response to said request, and transmitting a device instruction to the device.

The method may comprise the steps of reading the device instruction to identify device identification information, and forwarding the device instruction to the device identified.

The method may comprise the steps of receiving device information from the device, generating a message encoded in an Internet protocol comprising the device information and destination information, and transmitting the message to the message broker.

At least one of the device instructions and the message containing the device information may be encoded in an Internet protocol comprising HTTP.

According to a fourth aspect of the present invention, we provide a device control module operable to perform a method according to the third aspect of the invention.

According to a fifth aspect of the invention, we provide a system for remotely controlling a device over the Internet comprising a message broker, a remote control module according to the second aspect of the invention and a device control module according to the fourth aspect of the invention.

BRIEF DESCRIPTION OF THE DRAWINGS

The invention will now be described by way of example only with reference to the accompanying drawings wherein:

FIG. 2 is a diagram of the operation of the system of FIG. 1, FIG. 3 is an illustration of an alternative embodiment of the system of FIG. 1 providing bi-directional communication, FIG. 4 is a diagrammatic illustration of a further Internet communication system, and FIG. 5 is a diagrammatic illustration of an Internet communication system embodying the present invention.

DESCRIPTION OF THE PREFERRED EMBODIMENTS

Figure 1:
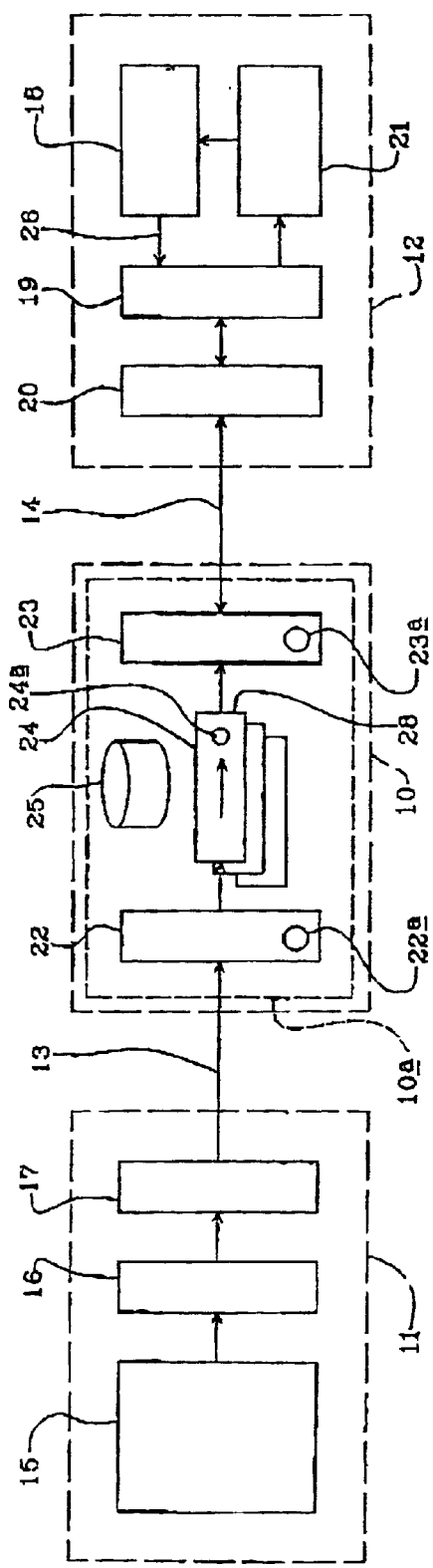
FIG. 1 is a diagrammatic illustration of an Internet communication system comprising a message broker.

Referring now to FIG. 1, a message broker is generally indicated at 10 operable to pass messages between a first client system 11 and a second client system 12. In this example, the message broker 10, first client system 11 and second client system 12 are connected via Internet links shown by arrows 13, 14 respectively. The first client system 11 comprises a publisher module, generally indicated at 15 which generates message information which is to be passed to the client system 12. The first client system is provided with a transmission module 16 to receive the message information from the publisher module 15 and forward it to the message broker 10 via the Internet link 13. The first client system 11 is also provided with a firewall 17, through which all communications between the client system 11 and the Internet pass and which in the present example is set to block incoming HTTP (HyperText Transfer Protocol) requests. In similar fashion, the second client system 12 comprises a subscriber module 18 operable to receive messages from the first client system 11. The second client system 12 is provided with a receiver module 19 operable to receive messages from the message broker 10 via the Internet connection 14, and a firewall 20 which is set to block all incoming HTTP requests. The subscriber module 18 receives instructions to send a message request from a call back module 21.

The first client system 11 and the second client system 12 in the present example comprise intranets of conventional type provided with access to the Internet through respective firewalls 17, 20, although it will be apparent that the client systems may comprise any appropriate system as desired.

The message broker 10 comprises a Web server with a multi-thread servlet engine 10a. The message broker 10 is provided with a first channel adapter, in this embodiment comprising a first channel adapter servlet 22, a second channel adapter, in this embodiment comprising a second channel adapter servlet 23 and a plurality of channels 24 each addressable by the first channel adapter servlet 22 and second channel adapter servlet 23. In the present example, the channel adapters 22, 23 are servlets which run within a thread allocated by the servlet engine 10a to process incoming HTTP requests. The servlets 22, 23 are operable to run appropriate to perform a "push" or "pull" operation to place messages in the channel 24 and withdraw messages from the channel 24 respectively.

Referring now to FIGS. 1 and 2, the communication system works as follows. The subscriber module 18 is instructed to invoke the call back module 21 on occurrence of a new message. The subscriber module 18 sends a subscribe instruction 26 to the receiver module 19. The subscribe instruction 26 contain source information corresponding to a message channel to enable the message broker 21 to establish an appropriate communication link. The receiver module 19 generates a message request 27 in the form of an HTTP GET request, including the source information from the subscribe instruction 26. The HTTP GET request is transmitted via the Internet link 14 to the message broker 10. In conventional manner the message broker servlet engine 10a receives the HTTP request and runs the second channel adapter servlet as specified in the HTTP request. The servlet 23 then processes the HTTP request, by reading the GET request 27 to obtain the source information to identify the relevant channel. In the present example, the source information is simply a channel identification name or number.

Once a channel has been identified, in this case the channel 28, the second channel adapter servlet 23 performs a pull operation 29 to attempt to pull an event from the channel 28. Where no event is found, i.e. no message has been placed in channel 28, no response will be sent by the second channel adapter servlet 23 until, in the present example, a pre-determined period of time has elapsed. In the present example, since the pull request is performed by a servlet 23, if there is no information in the identified channel the thread running the servlet 23 will "sleep" until the standard time-out period elapses or notification of a message "push" is received. Once the predetermined time period has elapsed, the thread running the servlet 23 is woken up in conventional manner. The second channel adapter servlet 23 then sends a standard time-out response to the receiver module 20. In this example, the standard HTTP time-out error message will be sent, code 504, as the HTTP GET response 31. On receipt of the time-out response 31, the receiver module 19 then promptly retransmits a GET request 27', and the second channel adapter servlet 23 on receipt of the HTTP GET request 27' will once again attempt to pull a message from the channel 28. This cyclical process of the receiver module 20 transmission a GET request to the second channel adapter servlet 23, receiving a time out response 31 and re-transmitting a GET request 27 may continue indefinitely until a message is received.

To send a message via the message broker 10, the publisher module 15 of the first client system 11 will generate message information, including destination information and content information i.e. the body of the message, and forward this message as a publish instruction 32 to the transmission module 16. The transmission module 16 will generate a message 33 in the form of an HTTP POST request and transmit this information via the firewall 17 and the Internet link 13 to the message broker 10. The message 33 is received by the message broker servlet engine 10a which runs the first channel adapter servlet 22 as specified in the HTTP request. The servlet 22 then processes the HTTP request by reading the destination information and identifies the appropriate channel in which the message should be placed. In the present example, as for the GET request source information, the destination information is simply a channel identification name or number. If no such channel exists, the first channel adapter servlet 22 may dynamically create the channel, i.e. allocate the channel name to one of the plurality of channels 24. In this example, the channel 28 is identified and the servlet 22 performs a push operation 34 to place the message on the identified channel. The first channel adapter servlet 22 then sends a notification 35 is sent to any thread listening to that channel, in this example the second channel adapter servlet 23.

Referring to FIG. 2, the push operation 34 has now placed the message in the channel 28 within the predetermined time-out period from the pull operation 29'. The second channel adapter servlet 23 receives the notification 35 and acts to pull the message from the channel 28. The second channel adapter servlet 23 then transmits a standard response to the HTTP GET request 36, including at least the content information of the message 32. In this example, the receiver module 20 then transmits a new event notification 37 to the call back module 21, including the message content information as part of the argument as part of the new event notification 37. In this example, the second receiver module 20 then transmits a new HTTP GET request 27", the second channel adapter servlet 23 then transmits a further pull request 29" and the cycle continues.

The communication system described is this particularly adaptable in allowing cross-platform operation and is scalable to any number of client systems 11, 12 as may be desired. The repeated GET request/GET response cycle thus enables a published message to be retrieved by the recipient in nearly real time, and the use of the HTTP protocol to transmit and retrieve messages enables the messages to pass through the respective firewalls 17, 20.

However, in the current HTTP protocol, a time out response is automatically provided. The time out response 30 might be advantageously regarded as a "heart beat" response, indicating the ongoing operation of the message broker 10.

In an alternative implementation, it might be envisaged that the functionality of the servlets 22, 23 could be implemented instead at socket level. A thread processing a HTTP PUT request will check whether there is a socket connection associated with the message channel. If yes, the message is simply be sent to the client system using the socket connection information, and then the socket connection is removed. If there is no socket connection, the message is stored in the message channel as discussed before. To retrieve a message, a thread processing an HTTP GET request checks the specified message channel. If a message is stored in the message channel, it is returned to the client system. Otherwise, the socket connection is stored as information associated with the message channel, and a time out specification placed in a time queue. If a message is pushed into the channel before time out occurs, the thread processing the HTTP PUT request simply sends the message to the client using the socket connection information as discussed above. In the event of a time out, the thread associated with the time out will wake up and retrieve the message channel identification name or number associated with the time out. If there is still socket connection information associated with the message channel, a time out response is sent to the client system using the socket connection and then the socket connection information is removed. If no socket connection information is associated with the message channel, this indicates that a message was sent to a client system in the interim. No action is then taken and the thread returns to the start of the process.

It will be clear that provisions may be made for example for security by using secure HTTP (HTTPS), message persistent storage and acknowledgement protocols as desired.

It will be apparent that a message to be transmitted by the message broker 10, both the first client system 11 and the second client system 12 must know the channel identification name or number of the appropriate message channel. For secure communication, it will also be apparent that the channel identification name or number must not be known to any third party. The channel identification name or number may be established between the first client system 11 and the second client system 12 by any means as desired For example, the second client system 12 may transmit a request to the message broker 10 for a channel for communication with the first client system 11. The message broker 10 may then allocate a channel and transmit an appropriate channel identification name or number via a secure connection to the first client system 11 and second client system 12. Alternatively, where there is some other communication link between the first client system 11 and second client system 12, the first client system 11 may simply transmit the channel identification name or number to the second client system 12. As discussed hereinbefore, if a first client system posts a message to the message broker 10, if a channel with the channel identification name or number does not exist, it will be created automatically, and the other client system 12 is then able to send a GET request including the channel identification name or number. It might also be envisaged that the message broker could comprise an address information store 25 which could contain address information, for example the addresses of the client systems 11, 12 and corresponding channel identification information if required.

A message broker may be used to establish bi-directional communications as shown in FIG. 3. Two channels, 28', 28" are allocated to establish a two-way communication link between a first client system 11' and a second client system 12'. In this example, the first client system 11' and second client system 12' are provided with publisher/subscriber modules 15', 18' which perform the functions of both modules 15 and 18 as set out above. Similarly, the client systems 11', 12' comprise transmission/receiver modules 16', 19' which have the functionality of both modules 16 and 19 as described above. A message broker 10' is provided with a first combined channel adapter 40 and a second combined adapter 41. The first combined channel adapter 40 comprises a first adapter element 22' operable to push messages onto channel 28' in the same manner as the first channel adapter servlet 22, and a second adapter element 23' operable to pull messages from channel 28" in the same manner as the second channel adapter servlet 23 described above. Similarly, the second combined channel adapter module 41 comprises a first adapter element 22" adapted to push messages onto channel 28" in like manner to the first channel adapter servlet 22 described above, and a second adapter element 23" operable to pull messages from channel 28' in the same manner of the second channel adapter servlet 23 described above. Using such an arrangement, each client system 11', 12' is operable both to transmit and receive messages via the message broker 10' using the method as described above in relation to FIG. 1. Because the system of FIG. 3 can be made transparent, it will be apparent that any suitable communication protocol may be used by the client systems 11', 12'.

It will be clear that such a communication system will have many potential applications. Two example applications will now be described, although it will be apparent that the potential applications are not limited to these two examples.

With reference to FIG. 4, it is often desirable for information located on an intranet to be available from outside the intranet, for example over the Internet. One method of doing this is to have a duplicate web server outside the intranet firewall which is provided with a portion of the information from the intranet server to which public access is desired. Alternatively, it is possible to provide authentication or password protection on the intranet server to allow access to the intranet through the firewall. A message broker as described hereinbefore can be used to provide secure access to an intranet without resorting to either of these provisions.

Referring to FIG. 4, a message broker is indicated at 40 and is similar in operation to the message broker of FIGS. 1 to 3. A first client system is shown at 41 and a second client system at 42. In this example, the fist client system 41 comprises a computer provided with a browser 41a of conventional type which connects via a firewall 43 and an Internet connection 44 to the message broker 40. The second client system 42 comprises an intranet web server 45, and an HTTP server adapter 46 operable to address the intranet web server 45, and also to connect via a firewall 47 and Internet connection 48 to the message broker 40.

The message broker 40 comprises an HTTP client adapter 49 and a server channel adapter 50. An address information store 51 is also provided. Two channels are allocated by the message broker 40 to form a link between the first client system 41 and a second client system 42. A first, permanent, channel 52 is operable to receive messages from the HTTP client adapter as discussed hereinbefore The message broker 40 also allocates a second, temporary channel 53 to receive messages from the server channel adapter 50. The server channel adapter 50 comprises a first adapter element 54a, operable to pull messages from a channel 52 in like manner to the second adapter module 23 described hereinbefore. The server channel adapter 50 comprises a second adapter element 54b operable to push messages onto the channel 53 in like manner to the first adapter module 22 described hereinbefore. The HTTP client adapter 49 is operable to push messages onto the permanent channel 52, and pull messages from the temporary channel 53. The client adapter 49 is also provided with an authentication element 55.

The system works as follows. A HTTP GET request is generated in conventional manner by the browser 41a and transmitted via the firewall 43 and Internet connection 44 to the message broker 40, where it is processed by the HTTP client adapter 49. The HTTP GET request may comprise a URL in conventional manner. Alternatively, where the information is available on the first client system 41 it may comprise additional destination information, such as the host name and port number of the destination intranet web server, or channel information. Such information may be stored in a cookie 56 on the first client system 41, or may be retrieved from the address information store 51. The HTTP GET request from the browser 41a is of course permitted to pass via the firewall 43 in conventional manner.

The HTTP client adapter 49 encapsulates the client request in HTTP form with the destination host name and port number added in the message header.

The message is pushed into permanent channel 52. The HTTP server adapter 46 and the first adapter element 54a of the server adapter are continually monitoring the permanent channel 52 in like manner to the second channel adapter 23 of FIG. 1. Thus, when a message is pushed into the permanent channel 52, it is retrieved and transmitted to the HTTP server adapter 46 through the firewall 47. The HTTP server adapter 46 extracts the HTTP client request and the destination host name and port number and sends the HTTP request to the intranet web server identified by the host name and port number.

The intranet web server 45 returns a standard HTTP GET response to the HTTP server adapter 46. The host name and port number of the intranet web server are replaced by the host name and port number of the message broker. The response is transmitted via the firewall 47 and Internet connection 48 to the message broker 40. The second adapter element 54 pushes the response into temporary channel 53. The HTTP client adapter 49 pulls the message from the temporary channel 53 and retrieves the HTTP response. The HTTP response is parsed and changed such that the intranet web server address found in the absolute URL is substituted by a corresponding message broker UTRL, and then sent via the Internet connection 44 and firewall 43 to the browser 41a in a conventional manner. The message broker domain is stored as a cookie 56 in the browser 41a for future use.

The request and response transmitted via the Internet link 48 may be encrypted or secured by appropriate means as desired, in the present example using secure socket layer (SSL) protocol. The message broker 40 can provide authentication and authorisation before the request is transmitted to the intranet web server 45, and so provide secure access to the intranet server 45 through the firewall 47.

Once the response has been pulled from the temporary channel 53 by the HTTP client adapter 49, the message broker 40 reallocates the temporary channel 53, making it available for other messages.

The HTTP client adapter 49 has similar functionality to the combined adapter module 38, but with the additional functions of encapsulating the HTTP client request and providing authentication and authorisation. The browser 42 may be enabled to access the Intranet web server by provision of an appropriate cookie which provides the necessary information to the HTTP client adapter 49, for example as part of the cookie 56. The cookie could be electronically signed by the provider of the intranet web server 45 such that the user of the browser 42 is happy to install the cookie 56 on his computer.

It will be apparent that although the message broker 40 has been described in terms of the system of FIGS. 1 to 3, such remote access to an intranet could be performed using any appropriate message broker system operable to receive an HTTP request from a first client system and forward the request in response to an HTTP request received from the second client system.

An embodiment of the present invention is shown in FIG. 5, for remote control of a device via the Internet using a message broker. A suitable configuration is shown in FIG. 5. A message broker system 60 is shown which operates in the same manner as the message broker 10' of FIG. 3. In this example, a first client system 61 is shown which comprises an appropriate network server comprising a firewall 62 and an Internet connection 63a. At least one PC 64 and a printer 65 are connected to the first client system 61. The first client system 61 is also provided with a device communication mobile comprising a remote diagnostic support tool (RDST) 66. The remote diagnostic support tool 66 is operable to communicate with the printer 65, in the present example using a standard peripheral meta language (PML).

The second client system 67 comprises a remote system which requires access to the printer 65, for example a technical support agency. The second client system 67 comprises a firewall 68, a remote control module 69 and an Internet connection 63b. At least one PC 70 is connected to the second client system 67.

The printer 65 is provided in this example with a control panel 65a of conventional type. Using the control panel 65a, a user is able to check and vary the printer configuration. The control panel 65a is also addressable by the remote diagnostic support tool 66 using PML.

When is desired to provide the second client system 67 with remote access to the printer 65, the remote diagnostic support tool 66 is enabled from the PC 64 to address the printer 65 and to establish a link over the Internet connection 63. The message broker 60 establishes a bi-directional communication channel comprising message channels 60a, 60b, as described hereinbefore in relation to FIG. 3. The PC 70 sends a device instruction to the remote control module 69. The remote control module generates a message encoded as an HTTP instruction comprising the device instruction, destination information identifying the message channel 60a and also device identification information as required. The remote control device 69 then sends the message through the firewall 68, and message broker 60 to the remote diagnostic support tool 66. The remote diagnostic support tool 66 transmits the device instruction to the printer 65. The printer 65 may return device information, in this example the printer make, serial number, and configuration. The RDST 66 then encodes the device information as an HTTP POST request, including destination information corresponding to the message channel 60b, and transmits this instruction to the remote control tool 69 via the message broker 60. This printer information is then transferred to the PC 70. It might be envisaged that the printer information be displayed as a simulated control panel, for example, an display 71. The operator of the PC 70 is then able to transmit further appropriate device instructions, for example to reconfigure the printer or transmit appropriate software update via the remote control 69 and remote diagnostic support tool 66 to the printer 65. The updated printer configuration can then be retrieved by the remote diagnostic support tool 66 and retransmitted to the remote control 69 as before. It might also be envisaged that, for example, updated driver software might be sent to the PC 64. Once the session has ended, the connections 63a, 63b to the message broker 60 are dropped. Such an arrangement permits nearly real time remote control of the printer 65 via the Internet.

It will be apparent that this configuration may be used to provide remote control of any appropriate device via the Internet, and not necessarily merely a printer.

It will be apparent that appropriate authentication and security may be provided at any relevant point of the system. A basic security feature is that the user of the PC 64 must enable the remote diagnostic support tool 66 to open a communication channel before the second client system 67 can obtain remote access to the printer 65. It might be envisaged that the messages transmitted by the second client system 67 are electronically signed or provided with an electronic certificate to confirm their authenticity.

Where the first client system 61 is connected to a plurality of printers, the relevant printer may be identified by any appropriate device identification means, for example its IP address, the domain name server name or a network address as appropriate.

Any device which supports PML may be controlled in such a manner, not merely printers.

It will be apparent that this application may be used with any appropriate message forwarding system as desired, and not necessarily simply with a message broker 60 as described herein. All the messages may be encrypted using secure socket layer protocol. The remote control is provided without requiring the setting up of a phone/modem connection, or by requiring the support agency in this example to give telephone instructions to the user on how to configure a printer and ask for feedback.

It will be apparent that the invention described herein may be implemented in any desired manner, whether in hardware, software or otherwise. Apparently, the invention may be implemented on conventional hardware provided with appropriate software according to the present invention.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method to process step herein is to be construed under those provisions unless the step, or steps, are expressly recited using the phrase "the step(s) for . . . ."

What is claimed is:

1. A method of operating a first client system to control a device provided on a second client system via the Internet, the method comprising:

generating a message comprising a device instruction and destination information;

encoding the message using an Internet protocol;

transmitting the encoded message to a message broker such that the message is placed in a first channel identified by the destination information, and;

retrieving returned device information from the second client system by:
  transmitting a message request to the message broker encoded using an Internet protocol and identifying a second channel, and
  receiving a response from the message broker comprising one of a time-out and a message comprising return device information.

2. A method according to claim 1 wherein the device instruction, message request and device information are encoded in an Internet protocol comprising HTTP.

3. A method according to claim 1 wherein the device instruction is generated in a Peripheral Meta Language (PML).

4. A method according to claim 1 further comprising generating an output in response to the device information.

5. A method according to claim 1 wherein the device instruction comprises device identification information.

6. A remote control module operable to perform a method according to claim 1.

7. A method of operating a second client system having a device to communicate instructions received via the Internet from a first client system to the device, the method comprising:

transmitting a message request to a message broker encoded using an Internet protocol and identifying a first channel, receiving a response from the message broker comprising one of a time-out and a message encoded using an Internet protocol comprising a device instruction, and, where the response comprises a message comprising a device instruction, transmitting the device instruction to the device.

8. A method according to claim 7 comprising reading the device instruction to identify device identification information, and forwarding the device instruction to the device identified.

9. A method according to claim 7 wherein at least one of the device instructions and the message containing the device information are encoded in an Internet protocol comprising HTTP.

10. A device control module operable to perform a method according to claim 7.

11. A method according to claim 7 further comprising:

receiving return device information, generating a message comprising the return device information and destination information;

encoding the message using an Internet protocol, and transmitting the encoded message to a message broker such that the message is placed in a second channel identified by the destination information.

12. A system for controlling a device over the Internet, the system comprising a first client system, a second client system having the device, and a message broker, the first client system being operable to generate a message comprising a device instruction and destination information;

encode the message using an Internet protocol, and transmit the message to a message broker, the message broker being operable to place the message in a first channel identified by the destination information, the second client system being operable to transmit a message request to the message broker encoded using an Internet protocol identifying the first channel, the message broker being operable to generate a response comprising one of a time-out if no message is present in the first channel and the message comprising a device instruction if the message is present in the first channel and send the response to the second client system, the second client system being operable, where the response comprises a message comprising a device instruction, to transmit the device instruction to the device.

13. A method according to claim 12 wherein the second client system is operable to:

receive return device information, generate a message comprising the return device information and destination information;

encode the message using an Internet protocol, and transmit the encoded message to the message broker such that the message is placed in a second channel identified by the destination information, the first client system being operable to retrieve the return device information from the second client system by transmitting a message request to the message broker encoded using an Internet protocol identifying the second channel, and the message broker being operable to generate a response comprising one of a time-out if no message is present in the second channel and the message comprising return device information if the message is present in the second channel and send the response to the first client system.

* * * * *